(12) United States Patent
Mayes

(10) Patent No.: US 10,472,295 B2
(45) Date of Patent: Nov. 12, 2019

(54) COMPOSITE MATERIAL FOR ENRICHING NATURAL SPORTS PLAYING FIELDS

(71) Applicant: Derrick Robert Mayes, Wyoming, OH (US)

(72) Inventor: Derrick Robert Mayes, Wyoming, OH (US)

( * ) Notice: Subject to any disclaimer, the term of this patent is extended or adjusted under 35 U.S.C. 154(b) by 227 days.

(21) Appl. No.: 15/656,073

(22) Filed: Jul. 21, 2017

(65) Prior Publication Data

US 2019/0023622 A1 Jan. 24, 2019

(51) Int. Cl.

| | | |
|---|---|---|
| C05C 11/00 | (2006.01) | |
| C05G 3/04 | (2006.01) | |
| C05G 3/00 | (2006.01) | |
| C09K 17/16 | (2006.01) | |
| C09K 17/18 | (2006.01) | |
| C09K 17/22 | (2006.01) | |
| C09K 17/32 | (2006.01) | |
| C09K 105/00 | (2006.01) | |

(52) U.S. Cl.
CPC ............ *C05C 11/00* (2013.01); *C05G 3/0052* (2013.01); *C05G 3/04* (2013.01); *C09K 17/16* (2013.01); *C09K 17/18* (2013.01); *C09K 17/22* (2013.01); *C09K 17/32* (2013.01); *C09K 2105/00* (2013.01)

(58) Field of Classification Search
None
See application file for complete search history.

(56) References Cited

U.S. PATENT DOCUMENTS

| | | | | |
|---|---|---|---|---|
| 1,619,679 A | * | 3/1927 | Hannaford | C05C 7/00 71/23 |
| 1,944,046 A | * | 1/1934 | Waggaman | C05C 11/00 71/18 |
| 3,932,166 A | * | 1/1976 | Vignovich | C05D 1/02 71/11 |
| 4,280,830 A | * | 7/1981 | Ferguson | C05C 9/02 504/360 |
| 4,378,238 A | * | 3/1983 | Goertz | C05C 9/02 504/101 |
| 4,411,683 A | * | 10/1983 | Goertz | C05C 9/02 564/59 |
| 4,743,288 A | * | 5/1988 | Hirsbrunner | C09K 17/48 106/900 |
| 5,676,727 A | * | 10/1997 | Radlein | C05C 3/00 71/11 |
| 6,155,749 A | * | 12/2000 | Tanner | C09K 17/04 106/900 |
| 10,005,699 B2 | * | 6/2018 | Amonette | C05C 11/00 |
| 2008/0064064 A1 | * | 3/2008 | Kensch | A23F 5/246 435/69.1 |
| 2009/0189113 A1 | * | 7/2009 | Lamperd | C09K 3/22 252/88.1 |
| 2011/0113983 A1 | * | 5/2011 | Bernu | C09K 17/50 106/15.05 |
| 2011/0265376 A1 | * | 11/2011 | Thrash | A01G 2/00 47/58.1 SC |
| 2013/0259582 A1 | * | 10/2013 | Birthisel | C09K 17/42 405/263 |
| 2016/0083309 A1 | * | 3/2016 | Pina | C05B 17/00 71/11 |
| 2016/0096779 A1 | * | 4/2016 | Handley | C05F 11/00 71/19 |
| 2017/0137711 A1 | * | 5/2017 | Stepan | C09K 17/14 |
| 2018/0237247 A1 | * | 8/2018 | Fascio | B65H 18/28 |

FOREIGN PATENT DOCUMENTS

| | | | | |
|---|---|---|---|---|
| KR | 2015061761 A | * | 12/2015 | ............ C09K 17/00 |
| KR | 2017051566 A | * | 5/2017 | ............ C09K 17/00 |
| KR | 2017076363 | * | 7/2017 | ............ C09K 17/40 |

* cited by examiner

*Primary Examiner* — Wayne A Langel
(74) *Attorney, Agent, or Firm* — Jenei LLC

(57) ABSTRACT

The invention herein provides a composite material suitable for the absorption of moisture in natural outside areas. More particularly, the composite material can be applied to both grassy and non-grassy natural areas to both absorb any excessive, apparent moisture therein and to also enrich the underlying earth of both grassy and non-grassy natural areas.

18 Claims, No Drawings

COMPOSITE MATERIAL FOR ENRICHING NATURAL SPORTS PLAYING FIELDS

FIELD OF THE INVENTION

The invention herein provides a composite co-polymer material suitable for the absorption of moisture in natural outside areas. More particularly, the composite material can be applied to both grassy and non-grassy natural areas to both absorb any excessive, apparent moisture therein and to also enrich, condition, preserve and grade the underlying earth of both grassy and non-grassy natural areas.

BACKGROUND OF THE INVENTION

Considerable time and energy are used in the play of sports outside. Most of this play, in various sports, occurs on grass fields, or on fields that are at least partially grassy. When play occurs outside, it is contingent upon favorable weather conditions. This is true whether the sport is amateur or professional. In professional sports considerable resources are marshaled for play to occur.

In sports like soccer (futbol), baseball, cricket, and American football, all of which are played professionally, outside play on grass surfaces occurs at great cost. Teams of grounds keeping professionals are enlisted to plant, cut, water and keep grassy play surfaces healthy. All manner of materials like fertilizer are used to build and maintain such surfaces. When it rains in abundance, these fields of play are abandoned for a time and often, covered up, to prevent further water saturation due to rainstorms.

Sometimes, long rain delays push play into the next or subsequent days depending upon how much more rain is received and the condition of the field of play once rain stops. In professional play, this costs time and money. In amateur play, it costs time, money, concession sales, parking fees and often missed opportunities to play at all. In amateur play particularly, there are no teams of grounds keepers to bring a field back to suitable and safe use for amateurs to continue or start their play. For example, fields used in amateur play are rarely if ever tarped or covered as is done on professional or college fields of play. In professional play, though grounds keepers exist, their use is both expensive and time-consuming.

Safety on fields of play contemplated herein is also paramount. When fields of play are rained upon, and/or un-level their safe use diminishes. Even when such fields have had time to dry and/or been treated by covering (e.g., a tarp cover), their safe use remains compromised. What is needed therefore is a product and/or method that increases the safety of a field of play herein once and as its excess moisture is removed.

What is needed is a low cost, effective solution to prepare, remediate, enrich, grade and/or maintain fields of play with respect to absorbing excess moisture therefrom, thereby enabling faster and safer use of the fields for play.

SUMMARY OF THE INVENTION

Accordingly, the invention provides a composite material useful for absorbing moisture from grassy surfaces while also providing a health benefit to such grassy surfaces and their lower earth substrates. The composite material comprises a nitrogen filled material; and a moisture absorbent material.

In practice, the nitrogen filled material and the absorbent material are mechanically or physically attached to one-another. This kind of attachment has been in some cases described as a biotechnological process and/or polymerization. The absorbent material is preferably highly hydrophilic. The nitrogen filled material preferably comprises a moisture content conducive for attachment to the absorbent material given its highly hydrophilic nature. The absorbent material is attached to the nitrogen filled material in a ratio of about five to one, preferably of about eight to one, and more preferably of about ten to one.

In another embodiment herein, the nitrogen filled material comprises multiple attachment surfaces. Each attachment surface is configured to readily receive a hydrophilic material, and especially the absorbent material herein. Ideally, the attachment surfaces of the nitrogen filled material receive the absorbent material by either spraying the material onto the attachment surfaces or by mixing the nitrogen filled material with the absorbent material whereby the attachment surfaces come into contact therewith.

The preferred nitrogen filled material comprises spent coffee grounds (SCGs). SCGs are rich in polysaccharides, lignin, proteins and minerals, showing their high biotechnological value to be used, for instance as substrates or solid supports in fermentation, and processes for the extraction and production of compounds. Chemical composition includes cellulose, hemicellulose, and lignin. Polysaccharides are the most abundant components in SCGs as glucose is polymerized into cellulose and hemicellulose structures. Functional and physiological properties of SCGs have water holding capacity (WHC). Structural characterization of SCGs shows morphology, and porosity when treated for total or partial degradation of Cellulose-lignin matrix. Therefore, the inventions attaching biotechnological mixing process decrease SGC crystallinity and consequently increase the porosity.

Most ideally, the nitrogen filled material wholly comprises spent coffee grounds. Such materials, whether coffee or not, comprise at least 1% by volume of nitrogen. Preferably, such nitrogen filled materials comprise at least 2% by volume of nitrogen. More preferably, the nitrogen material comprises at least 3% by volume of nitrogen. In another embodiment herein, the nitrogen filled materials comprises 4% or more by volume of nitrogen.

In all embodiments herein, the absorbent material is biodegradable. One suitable absorbent material of the kind contemplated herein is sodium polyacrylate. Another suitable absorbent material of the kind contemplated herein is potassium polyacrylate. Yet another suitable absorbent material of the kind contemplated herein is a corn starch based absorbent.

DETAILED DESCRIPTION OF THE INVENTION

By the term "biodegradable", it is meant herein capable of being broken down (decomposed) rapidly by the action of microorganisms. Biodegradable substances include food scraps, cotton, wool, wood, human and animal waste, manufactured products based on natural materials (such as paper, and vegetable-oil based soaps).

By the term "non-biodegradable", it is meant herein a substance or chemical that cannot be changed to a harmless natural state by the action of bacteria, and may therefore damage the environment including humans.

By the term "field of play" it is meant herein either a grassy surface, a natural non-grassy surface (e.g., dirt field), or both on which players, whether professional or amateur, engage in sport.

By the term "grading" it is meant herein the raising of a sports field over time due (e.g., via elevating and/or leveling) to the consistent application of the composite material provided herein.

The invention herein provides a low cost, effective solution to prepare, remediate, enrich, and/or maintain fields of play with respect to absorbing excess moisture therefrom, thereby enabling faster and safer use of the fields for play. It provides a composite material useful for absorbing moisture from grassy surfaces while also providing multiple health benefits to such grassy surfaces and their lower earth substrates. The composite material comprises a nitrogen filled material; and a moisture absorbent material.

Also importantly, the invention herein is useful for grading a field of play (i.e., sports field) whereby either the grassy or non-grassy portion thereof can be leveled to the same or higher level, if desired, as an adjacent field portion. Such grading enables a safer field for use by players on the field.

In preparation, the composite material provides both a nitrogen rich material and an absorption material (i.e., preferably a superabsorbent material) that is biodegradable. It can be distributed to a field of play prior to the presence of excessive moisture. The composite material is both human safe and pet safe such that it can be interacted therewith immediately after its distribution. This is a particularly useful feature first for enabling immediate use of a field of play and for enabling players to help in its distribution beyond the first layer of application thereto.

By the term "superabsorbent material" it is meant herein one or more of the kinds of superabsorbent polymers (i.e., SAPs) well known by persons of skill in the art. Superabsorbent polymers are functional macromolecules with the ability to absorb water. When, for example, powdered SAP particles are soaked in water, or come into contact with water, they transform into hydrogels that can release the absorbed water slowly to whatever its surroundings are. Such hydrophilic polymers exist in three forms: natural (polysaccharide derivatives), semi-artificial (cellulosic primitive derivatives) and artificial. Artificial polymers are more popular than natural polymers to their stability towards environmental breakdown.

The non-biodegradability of these synthetic SAPs causes serious long-term environmental issues. Also, SAPs derived from petrochemical sources cause serious economic problems in the future. Due to these growing environmental concerns, attempts are being made to replace artificial SAPs with natural polymer based SAPs. The importance of using natural polymer based SAPs are due to their biodegradability, non-toxicity of the base component and their sustainability.

Superabsorbent hydrogels can be used to retain moisture in the surrounding soil during plant growth and transportation. Hydrogels act as miniature water reservoirs in soil, releasing water into the soil and maintaining moisture balance in the soil. They have the capacity to release the absorbed water depending on the moisture equilibrium change of the soil or on the requirement of plant roots. The presence of water in soil is essential, as it ensures the availability of nutritive elements to vegetation and aids in better growth rate of plants. The performance of a superabsorbent polymer depends on the chemistry and formation conditions and the chemical constituents of the soil. Importantly, the incorporation of the superabsorbent helps to conserve the moisture content in the soil to which it is applied.

Mechanically, composite material can be applied to a field of play through a push spreader of the kind well known by persons of skill in the art and lay gardeners for distributing fertilizer to lawns. The means for application may be chosen as circumstances and conditions of the application warrant and with particular attention to the desirability of even distribution over the area of the application. The particle size of the composite material herein is similar in size to such well-known fertilizers sold in retail stores for the purpose of fertilizing lawns. Ideally, composite material particles flow in a pouring manner, are particulate and do not clump together, especially when stored over time.

In terms of application, when laid or blown onto a dirt field of play, composite material herein will lay substantially on the top surface thereof. If the field of play is grass, composite material will lay, initially, on the top surface of the grass at or near the blade tips of grass. Gravity will pull the composite material downward. The composite material travels from the top of the grass down to the underlying earth from which the grass springs up. Since the composite material is immediately human and pet safe, players that contact the composite material during play can cause it to move more quickly to the earth slightly below the earth's surface.

In the case of remediation, i.e., when excessive moisture exists on the field of play, composite material may be distributed to the field of play at some time soon after the cessation of rain. The depth of application will vary with the nature of the dirt/soil and amount of moisture present from rain, flooding, sewer back-up, etc. Playing fields having a high silt or sand content may require additional amounts of composite material. The composite material is then worked into the dirt/soil by raking and tilling or harrowing to approximately two to eight inches depth. Preferably, the composite material is worked until it is uniformly dispersed through the dirt/soil layer. At such distribution, the composite material, which is hydrophilic, attaches to as much of the moisture (i.e., water) that it can entrap and hold. At such attraction, the moisture bonds primary to the absorbent material component of the composite material. At such bonding, the now combination of absorbent material and moisture form a gel or slurry-like substance which is attached to the nitrogen filled material. The gel like substance holds the moisture and prevents it from being immediately released back to the field of play.

Over more time the gel or slurry-like substance can be purposefully mixed with the surface of the field of play, whether grass or dirt, or allowed to settle over time to the lowest surface of the field of play. Also over time, the gel like substance will release its moisture content slowly and in a manner that ensures the continued use of the field of play.

In this use of the composite material, i.e., remediation, the objective is to lower the moisture content of a field of play. More specifically, the objective is to lower the moisture content thereof as quickly as possible to enable faster use of the field of play for use.

For enrichment, the composite material, because of its high nitrogen content, releases its nitrogen over time thereby providing an enhanced growth environment to a field of play, particularly for a grassy field. It is well known by persons of skill in the art, that nitrogen rich materials added to vegetation, plants, grass, and the like service to increase bounty and yield of the foregoing. The objective herein is, in part, to strengthen and increase the grass of a field of play. This is particular useful for grass fields that remain in continuous, hard use for a season, a month or more, or, in some locales, a year.

The composite material herein, therefore, provides biotechnological and synergistic benefits of moisture absorption, earth enrichment through the addition of nitrogen thereto and then slow release of captured moisture over time. These three benefits, operating in concert, serve to produce a stronger, healthier and safer field of play in the short and long term life of the field of play.

When the composite material is added to a field of play either in preparation thereof or in remediation thereof, either addition serves to maintain the field of play over time. The composite material releases both nitrogen and moisture over time. Ideally, the composite material is applied on a regular schedule of preparation and at a suitable time of added moisture to the field of play. When applied in regular intervals, e.g., once or twice per month, the field of play receives an enhanced moisture absorption benefit when future rains occur. This is true because absorbent material component of the composite material biodegrades over time. Also, the absorbent is affective for multiple uses.

When the absorbent material bonds to moisture, over time it releases that moisture. If the absorbent material has not fully biodegraded, it substantially retains its capacity to re-absorb moisture that touches it. Depending upon its rate of biodegradability, the absorbent material may capture, release and re-absorb moisture for multiple cycles.

In practice, the nitrogen filled material and the absorbent material are mechanically or physically attached to one-another. The absorbent material is preferably highly hydrophilic. The nitrogen filled material preferably comprises a moisture content conducive for attachment to the absorbent material given its highly hydrophilic nature. The absorbent material is attached to the nitrogen filled material in a ratio of about five to one, preferably of about eight to one, and more preferably of about ten to one.

Also importantly, the invention herein is useful for grading a field of play (i.e., sports field) whereby either the grassy or non-grassy portion thereof can be leveled to the same or higher level, if desired, as an adjacent field portion. Over time, sports fields can be made uneven and in certain extreme circumstances, raised above a safe level of acceptable play through the dumping of sand on the field. When this happens in season, there are few, if any suitable remedies. In the off-season, such fields can be backfilled with dirt and/or sod to re-level a sports field.

In season adjustments to such fields are all but unheard of. The composite material herein, in addition to its usefulness and soil and grass enrichment, can also be used to grade. A sports field is graded herein when the composite material is added to a sports field in several applications. In fact, the composite material herein can be used to prevent degrading and erosion of a sports field through regular, consistent application of the composite material.

The nitrogen filled material of the composite material, i.e., preferably, the spent coffee grounds, acts as a natural constituent to any grassy or non-grassy surface especially when mixed into the soil of a grassy or non-grassy surface of a sports field. When spent coffee grounds are mixed with absorbent material herein, the composite material forms particulate granules that can aggregate to form clumps that resemble soil particles. These particles can also be configured to act like free flowing soil particles that are easily distributed to a sports field and that build up areas of the field through grading and leveling.

In another embodiment herein, the nitrogen filled material comprises multiple attachment surfaces. Each attachment surface is configured to readily receive a hydrophilic material, and especially the absorbent material herein. Ideally, the attachment surfaces of the nitrogen filled material receive the absorbent material by either spraying and/or mixing the material onto the attachment surfaces or by mixing the nitrogen filled material with the absorbent material whereby the attachment surfaces come into contact therewith. The preferred nitrogen filled material comprises spent coffee grounds. The most preferred nitrogen filled material herein are spent coffee grounds. Most ideally, the nitrogen filled material wholly comprise spent coffee grounds. Such materials, whether coffee grounds or not, comprise at least 1% by volume of nitrogen. Preferably, such nitrogen filled materials comprise at least 2% by volume of nitrogen. More preferably, the nitrogen material comprises at least 3% by volume of nitrogen. In another embodiment herein, the nitrogen filled materials comprises 4% or more by volume of nitrogen.

It is important to note that using spent coffee grounds instead of non-spent coffee grounds (i.e., virgin coffee grounds) is critical. Virgin coffee grounds are highly acidic in comparison to spent coffee grounds. Such high acidity precludes their use on a sports field, because the grass and vegetation thereof can neither thrive nor survive such high acidity. Also, spent coffee grounds provide a natural anti-microbial benefit that enhances the overall health of sports fields (i.e., their grass and vegetation) by attacking harmful microbials that frequent such grass and vegetation and do severe damage thereto.

Also importantly, the morphology of spent coffee grounds is different than that of virgin coffee. This morphological difference is key to the combination of the spent coffee grounds with absorbent particles generally, and super absorbent particles (SAPs) in particular. Because of this morphological difference, spent coffee grounds are readily combinable with SAPs in a manner by which an additional binder is not necessary. That is, SAPs of the kinds disclosed herein (i.e., those having one or more glucose molecules attached thereto) are readily combinable with spent coffee grounds, and do not require an intermediary binder for such attachments.

The attachment between SAPs and spent coffee grounds is dynamic and reproducible. When the composite material herein is formed and then spread to a sport field that has been rained upon or soon will be rained upon, the moisture from the rain is enveloped substantially by the SAP component of the composite material. Moisture is also enveloped, at least partially, by the spent coffee ground portion of the composite material. When the SAP envelopes moisture, it substantially separates or detaches from the spent coffee ground particle to which it was attached. This produces the gel phase of the SAP. The gel phase of the SAPs herein occurs when SAPs of the kind disclosed become substantially filled with moisture (i.e., water) thereby causing the SAPs to expand many times beyond their non moisture filled size.

Over time, the SAP releases the moisture that it absorbs to the earth upon which it resides, some of which moisture also being released to the atmosphere. At such release, in the presence of spent coffee grounds which themselves have substantially settled to the earth's substrate of the sports field, the SAPs and spent coffee grounds re-attach thereby re-forming the composite material described herein. This cycle of detachment and re-attachment can occur many times over the life of the composite material. This is the dynamic and reproducible nature of the composite material disclosed herein.

Ideally, the composite material herein will re-form at least five times over its useful life. More ideally, the composite material herein will re-form at least ten times over its useful life. Most ideally, the composite material herein will re-form at least fifteen times over its useful life. By the term "useful life", it is meant herein that the functionality of the composite material provides the ascribed benefits detailed herein more than once and over time.

Such detachment and re-attachment of spent coffee grounds to SAPs herein is important and a clearly distinct feature over the prior art. First, since there is no need for a binder between SAPs and spent coffee grounds, there is no need to mechanically re-insert a binder for the composite material to re-form at re-attachment. Second, the beneficial use of the composite material herein is employable more than once and over time—this disables the need to re-apply new composite material every time that there is rainfall or some other event that causes an abundance of moisture onto a sports field. Third, the morphology of the SAPs and spent coffee grounds synergistically enable multiple detachment/re-attachment cycles without additional mechanical or chemical steps or additives.

In all embodiments herein, the absorbent material is biodegradable. One suitable absorbent material of the kind contemplated herein is polysaccharide (Amylose) (Amylopectin) [—C3H5NO][Cx(H2O)y][(CH2O)n][(C6H10O5)n,]

Another suitable absorbent material of the kind contemplated herein is sodium polyacrylate. Sodium polyacrylate is a sodium salt of polyacrylic acid with the chemical formula [—CH2CH—] and broad application in consumer products.

Another suitable absorbent material of the kind contemplated herein is potassium polyacrylate. Each material is a part of the family of biodegradable polymers well known in the art.

Biodegradable polymers are a specific type of polymer that break down after its intended purpose to result in natural byproducts such as non-harmful gases (e.g., carbon dioxide-$CO_2$, nitrogen-$N_2$), water, biomass, and inorganic salts, none of the foregoing being harmful to the environment.

Importantly, the absorbent polymers herein are preferably biodegradable. In order for the composite to operate properly, (acting as block co-polymers) each composite material must be environmentally friendly and, in fact, improve the environment to which it is applied. As is well known, most polymers, including poly(ethylene) and poly(propene) are not biodegradable. This means that microorganisms cannot break them down, so that they last for many years in the environment. A useful property of such non-biodegradable polymers is that they are unreactive, so they are suitable for storing food and chemicals safely. Unfortunately, this property makes it difficult to dispose of such polymers. They are often buried in landfill sites or incinerated—burned.

As noted hereinabove, the preferred nitrogen filled material are spent coffee grounds. Although the grounds do not generally alter the soil's pH, they do improve soil texture and drainage. Additionally, as spent coffee grounds decompose, they release nitrogen, potassium, phosphorus and other minerals that support plant growth. Some examples of plants that thrive in a nitrogen-rich planting area include leafy vegetables such as spinach, tomatoes, corn, roses, camellias, rhododendrons and azaleas. As a bonus, coffee grounds are reputed to have a deterrent effect on garden pests. Persons of skill in the art well understand that using coffee grounds in mulch helps repel pests including squirrels and rabbits from damaging vegetables such as beets, broccoli, beans, peas or lettuce.

Spent coffee grounds release nutrients as the fungi and bacteria in the soil break them down, a process that can take, days, weeks or several months. In the meantime, it's helpful to have a supplemental fertilizer in the planting area to support plant growth while the coffee grounds decompose. Ideally, using no more than between five to seven pounds of coffee grounds for every 100 square feet of planting area.

Use of spent coffee grounds in amending mineral soils up to 35 percent by volume coffee grounds will improve soil structure over the short-term and over the time. Use of the coffee grounds at the specified incorporation rates (rototilled into a 2- to 4-inch depth) will substantially improve availabilities of phosphorus, potassium, magnesium and copper and will probably negate the need for chemical sources of these plant essential elements.

Having described in detail the preferred embodiments of the composite material and its application, a person skilled in the art will be able to make various changes, alterations and modifications while continuing to practice the inventive principles described herein. It is therefore intended that all such modifications and alterations be covered as they are embraced within the spirit and scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A composite material for use to amend soil, comprising: a. A nitrogen filled material comprising spent coffee grounds having one or more attachment surfaces; and b. A moisture absorbent material comprising one or more superabsorbent polymers, wherein the one or more superabsorbent polymers come into contact with the one or more attachment surfaces.

2. The composite material of claim 1 wherein the one or more superabsorbent polymers are biodegradable superabsorbent hydrogels.

3. The composite material of claim 2 wherein the one or more superabsorbent polymers are natural or semi-artificial polymers.

4. The composite material of claim 3 wherein the one or more superabsorbent polymers are selected form the group consisting of sodium polyacrylate, potassium polyacrylate and polysaccharide.

5. The composite material of claim 1 wherein the nitrogen filled material comprises a moisture content conducive for attachment to the absorbent material.

6. The composite material of claim 5 wherein the nitrogen filled material comprises at least 1% by volume of nitrogen.

7. The composite material of claim 2 wherein the composite material forms particulate granules.

8. The composite material of claim 1 wherein the attachment surfaces of the nitrogen filled material receive the absorbent material by either spraying or mixing the material onto the attachment surfaces or by mixing the nitrogen filled material with the absorbent material.

9. The composite material of claim 1 wherein the absorbent material is attached to the nitrogen filled material in a ratio of five to one.

10. The composite material of claim 9 wherein the absorbent material is attached to the nitrogen filled material in a ratio of eight to one.

11. The composite material of claim 10 wherein the absorbent material is attached to the nitrogen filled material in a ratio of ten to one.

12. The composite material of claim 1 wherein the composite material is usable for grading and leveling of a field of play.

13. The composite material of claim 12 wherein the grading raises the field of play over time.

14. The composite material of claim 1 wherein the nitrogen filled material and the moisture absorbent material are detachable and re-attachable for multiple cycles over time.

15. The composite material of claim 1, wherein the composite is mixed at a ratio of between five to seven pounds of spent coffee grounds for every 100 square feet of soil.

16. The composite material of claim 1, wherein the composite is mixed into soil for amending at up to 35 percent by volume spent coffee grounds.

17. The composite material of claim 1, wherein the composite is mixed into soil for amending at a depth of 2- to 4-inch depth.

18. The composite material of claim 1, wherein the composite further comprises a supplemental fertilizer to support plant growth.

* * * * *